United States Patent [19]
Schmidt

[11] 3,741,386
[45] June 26, 1973

[54] X-RAY FILM PACKAGE

[75] Inventor: Gunter Schmidt, Malibu, Calif.

[73] Assignee: E. I. du Pont de Nemours and Company, Wilmington, Del.

[22] Filed: Apr. 22, 1971

[21] Appl. No.: 136,530

Related U.S. Application Data
[63] Continuation-in-part of Ser. No. 52,980, July 7, 1970.

[52] U.S. Cl. .............................. 206/62 R, 206/57 R
[51] Int. Cl... B65d 85/00, B65d 85/30, B65d 85/62
[58] Field of Search ....................... 206/62 R, 57 R; 229/68, 87 R, 3.5 R

[56] References Cited
UNITED STATES PATENTS

| | | | |
|---|---|---|---|
| 3,519,124 | 7/1970 | Barker et al. ..................... | 206/57 R |
| 3,420,405 | 1/1969 | Taylor............................... | 206/62 R |
| 1,844,468 | 2/1932 | Fischer............................. | 206/57 R |
| 3,360,258 | 12/1967 | Nix................................... | 206/57 R |
| 1,662,080 | 3/1928 | Silbar.............................. | 206/57 R |

Primary Examiner—William T. Dixson, Jr.
Attorney—Lynn Barratt Morris

[57] ABSTRACT

A package comprising a light-proof envelope or bag containing a plurality of X-ray film sheets stacked for co-operation with a dispensing machine and useful in a daylight handling system for daylight loading and unloading of cassettes. The film sheets are identical and may have a photographic emulsion layer on one or both surfaces. The adjacent films in the stack have their surfaces in contact. Each sheet has a cut-away portion along one edge thereof for coacting with a film selector cam. In the stack, the sheets are alternated so that the cut-away portions lie along a common stack edge and are arranged in two parallel rows. The cut-away portions in adjacent sheets are in different rows and in superposition. After the package is in a dispenser, the envelope or bag is stripped from the stack so that the sheets can be removed one at a time from the stack and passed into film holders or cassettes engaged with the dispensing machine.

10 Claims, 4 Drawing Figures

PATENTED JUN 26 1973 3,741,386

INVENTOR
GUNTER SCHMIDT

BY Lynn Barratt Morris
ATTORNEY

X-RAY FILM PACKAGE

This application is a continuation-in-part of my application Ser. No. 52,980, filed July 7, 1970, for X-ray Film Package.

BACKGROUND OF THE INVENTION

This invention relates generally to an X-ray film package particularly useful in a daylight handling system of the type disclosed in my U.S. Pat. application Ser. No. 52,848, filed on July 7, 1970, for "Daylight Film Handling System".

In the conventional use of X-ray films, as by dental and medical technicians, an X-ray film sheet is normally loaded into a cassette in a darkroom, exposed with the patient and then again taken into the darkroom for removal from the cassette for processing. The necessity of darkroom handling of the X-ray film is inconvenient, time-consuming and costly.

OBJECTS AND SUMMARY OF THE INVENTION

An object of this invention is to provide a simple and dependable, light-proof package of photo-graphically-sensitive film sheets and, more particularly, X-ray films from which the film sheets can be withdrawn one at a time. Another object is to provide such a package useful in a film handling system and film unloading machine which enables a film sheet to be loaded into a cassette in daylight without inadvertently exposing the film.

In accordance with the present invention, the photosensitive film sheets are provided with cut-away portions of small area along one edge prior to being placed in superposition into an actinic light-impermeable envelope or bag. The cut-away portions can be of various shapes, e.g., arcuate, including semi- or quarter- circular, triangular, square, or other shapes, and of suitable area for co-operation with a suitable film selector cam of a dispensing device or machine.

Preferably, the cut-away areas are spaced a short distance from a center line perpendicular to the ends of a film sheet. When a plurality of sheets are stacked with the orientation of successive sheets being alternated, the cut-away portions of alternate sheets will be in two rows, and preferably along a common edge. In a stack of 100 sheets, for example, the 50 odd sheets will have their cut-away portions in superposition in one row, while the 50 even sheets will have the cut-away portions in superposition in a second row.

By having the cut-away portions a short distance from the center line rather than as cut-away or chamfered corners, different sizes of film will interfit with the set film selector cams of a dispensing device or machine.

In cutting or punching the films to provide a cut-away area to prevent improper assembly of a stack of films, it is best to cut or punch opposite ends or sides of the film in the same manner. This will prevent one film from being assembled in the stack with no cut-away area over both superposed rows of cut-away.

A package in accordance with the present invention is useful in conjunction with a light-tight dispenser which stores the film sheet stack, and is capable of being operated to strip the envelope from the stack and to then dispense one sheet at a time from the stack. Sheets are dispensed one at a time by alternately rotating a pair of film selector cams adapted to bear against the stack in alignment with the two rows of cut-away portions to free the outermost sheet from the stack when one cam moves out of engagement therewith and the other cam moves into alignment with the respective cut-away portion in the other row.

DESCRIPTION OF PREFERRED EMBODIMENTS

Figure 1:
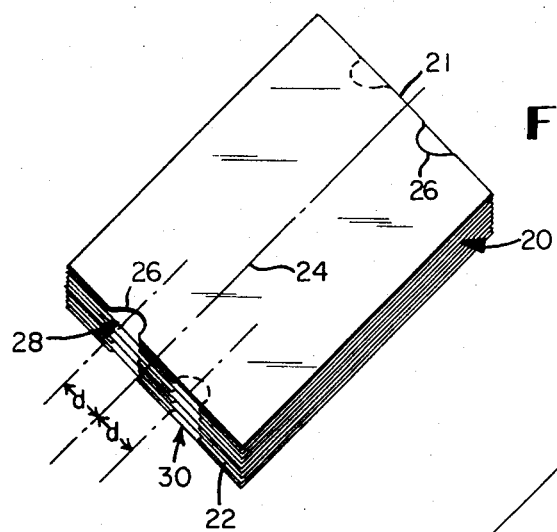
FIG. 1 is an isometric view illustrating a stack of X-ray film sheets having semi-circular cut-away portions in superposition.
Figure 2:
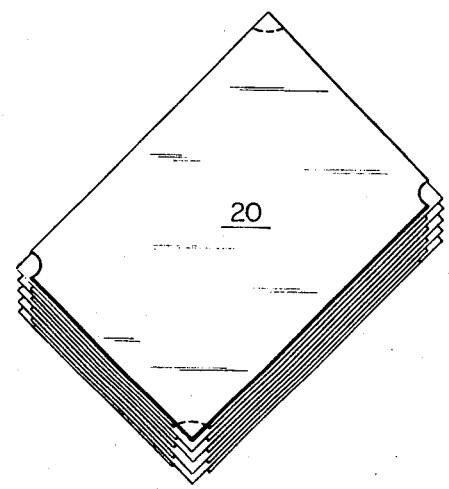
FIG. 2 is a similar isometric view of a stack of X-ray film sheets wherein the cut-away portions are at the corners of the film sheets.

With reference to FIG. 1 of the drawing showing a stack of X-ray film sheets having cut-away areas on opposite ends of the film sheets, the envelope or bag is not shown. In accordance with this preferred embodiment of the invention, all of the film sheets 20 have a semicircular cut-away area along each opposite common stack edges 21 and 22, the cut-away areas being spaced from a center line 24 extending perpendicular to edges 21 and 22. All of the sheets 20 have an identical cut-away essentially semicircular portion 26 formed in edge 22 at a certain distance, $d$, from center line 24. The film sheets 20 are stacked with the cut-away portions of successive sheets being alternated so that cut-away portions in even sheets be along a common stack edge and are in superposition to form one row. The cut-away portions in odd sheets, in like manner, form a second row of cut-away portions in superposition. In a stack of one hundred film sheets, the fifty odd numbered sheets in the cut-away portions form row 28 and in the even numbered sheets, the cut-away portions form row 30.

Figure 3:
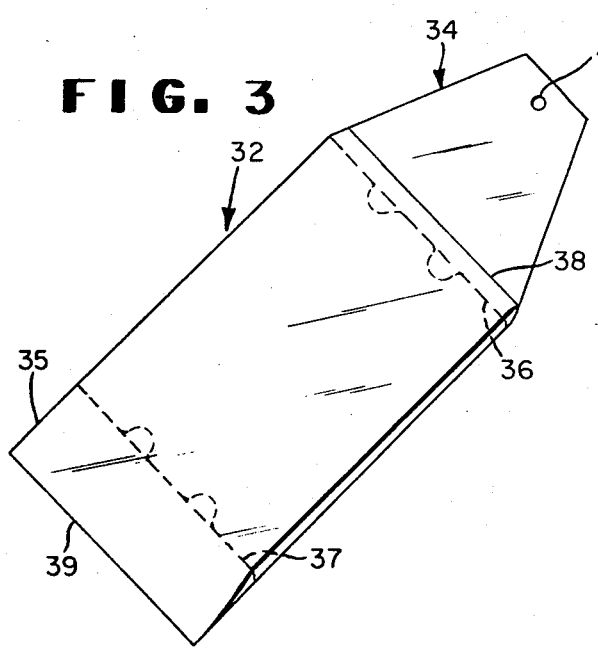
FIG. 3 is an isometric view of a film package of the invention.
Figure 4:
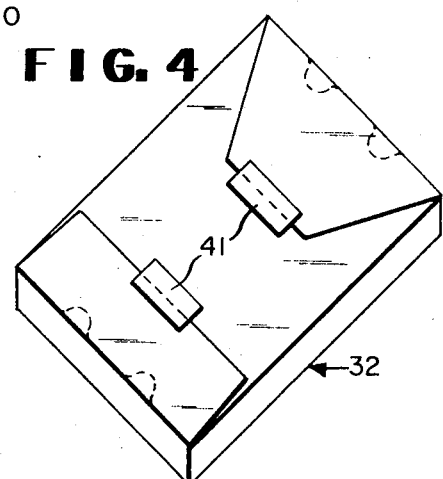
FIG. 4 is an isometric view of an alternative film package showing the ends of the envelope folded back onto and taped to the package.

The stack of film sheets having cut-away portions, as shown in FIGS. 3 and 4, are enclosed within an actinic light-opaque or impermeable envelope or bag 32 that is permeable to X-rays. Preferably, the envelope is made of flexible plastic material opaque to actinic radiation. The material may be polyethylene, polypropylene, polyvinyl chloride/acetate, etc., containing a light-absorbing pigment or opacifying agent, for example, carbon black. Alternatively, the envelope can be made of opaque, multi-ply paper, for example, two-ply paper, one of which is opaque. The envelope preferably is made sufficiently long so that its leading and trailing edges 34 and 35 extend beyond the leading and trailing edges 36 and 37 of the film sheets in the envelope. Edge 34 or 35 can be tapered. The envelope is sealed (preferably heat sealed) along the bottom edge 39 and along line 38. A hole 40, with its periphery heat-sealed, can be provided in the leading edge of the envelope for engagement with a pin on a mandrel. However, the leading edge can be attached to a mandrel or other envelope-removing member in other ways.

As shown in FIG. 4, the ends of the envelope are folded over the ends of the package and along a face of the envelope. The end of the folded portion can be attached to the face by means of pressure-sensitive tape 41.

In using the film package, it is inserted into a dispenser machine, the leading end of the film is freed from any sealing tape and attached to a rotatable bar or mandrel. The trailing end of the envelope is cut by a suitable knife while in a light-lock position. Then, when the package is in a light-tight dispenser, the envelope is pulled off the stack of films. This can be done in a dispenser machine, as shown in my application Ser. No. 52,848, filed July 7, 1970.

In removing the film sheets from the stack in a dispenser, a film selector cam will be in superposition over one row of cut-away portions, and another cam will be in superposition with the other row. As one cam is rotated on the top film sheet, it will jump out from the stack and cam, slide over the outer surface of the other cam, and pass through a discharge orifice into a cassette or film holder. By returning one cam into the cut-away portion and rotating the other cam, the next sheet will jump out from the stack in like manner. This action can be repeated until the entire stack of film sheets is dispensed.

The novel film package can be placed in any suitable outer box, e.g., a slip-cap box, for protection and shipment.

From the foregoing description, it will be apparent that applicant has provided a novel daylight loading film package. When used in a proper dispensing machine or apparatus, the film sheets can be successively withdrawn from the machine and introduced into a cassette. The package is simple, but effective and dependable. It does not require the presence of separate interleaving opaque paper sheets or folders. Individual film sheets do not have to be withdrawn by hand in a darkroom and transferred to an open cassette.

I claim:

1. A film package for use in a daylight handling system, said package comprising
   a. a plurality of substantially identical photographically sensitive film sheets, each sheet having a cut-away portion of small area along an edge thereof, said sheets being stacked in alternating superposition whereby the cut-away portions of alternate sheets form discontinuous, spaced apart, parallel rows; and
   b. cover means opaque to actinic radiation surrounding said stack.

2. A package according to claim 1 wherein said rows are spaced apart along a common edge of said stack.

3. A package according to claim 2 wherein said rows are spaced equidistant from opposite sides of a center line perpendicular to said common edge.

4. A package according to claim 3 wherein said cut-away portions are essentially semicircular.

5. A package according to claim 3 wherein said cut-away portions are present in the leading and trailing edges of each sheet thereby providing discontinuous, spaced apart, parallel rows in the leading and trailing edges of said stack.

6. A package according to claim 1, wherein the cut-away areas are essentially semicircular in shape.

7. A package according to claim 1, wherein the cover means is a flexible plastic envelope.

8. A package according to claim 1, wherein the film sheets are rectangular; and wherein
   the cover is an envelope of flexible plastic material having a width equal to the width of the sheets and a length greater than the length of the film sheets.

9. A package according to claim 1, wherein the film sheets are rectangular; and wherein
   the cover is an envelope of flexible plastic material having a width equal to the width of the sheets and in length extending beyond the length of the film sheets and adapted to be folded over the respective ends of the stack and taped to the face of the envelope.

10. A package according to claim 9, wherein one extended end of the envelope is tapered.

* * * * *